United States Patent
Pittet et al.

[11] 3,956,393
[45] May 11, 1976

[54] PROCESS FOR PREPARING ALPHA-SUBSTITUTED ACETALDEHYDES

[75] Inventors: Alan Owen Pittet, Atlantic Highlands; Erich Manfred Klaiber, Neptune, both of N.J.

[73] Assignee: International Flavors & Fragrances Inc., New York, N.Y.

[22] Filed: Sept. 19, 1974

[21] Appl. No.: 507,414

[52] U.S. Cl.............................. 260/598; 252/522; 131/2; 131/17 R; 426/538; 260/468 R
[51] Int. Cl.²................ C07C 45/00; C07C 47/42
[58] Field of Search............................ 260/598, 599

[56] References Cited
OTHER PUBLICATIONS
Wenkert et al., Nature, 170, 708 (1952).
Boeseken et al., Rec. Trav. Chem., 50, 827 (1931), 52, 874 (1933), 55, 786 (1936).
Berichte, 42, 589 (1909).

*Primary Examiner*—James O. Thomas, Jr.
*Assistant Examiner*—G. Breitenstein
*Attorney, Agent, or Firm*—Arthur L. Liberman; Harold Haidt

[57] ABSTRACT

Processes are described for the preparation of 2,2,6-trimethyl-1-cyclohexen-1-ylacetaldehyde (hereinafter referred to as "beta-cyclohomocitral" which either (A) comprises the steps of:

i. Oxidizing beta-ionone having the formula:

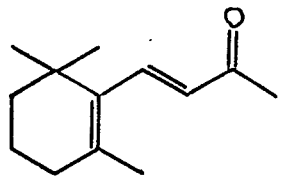

with a peralkanoic acid having the formula:

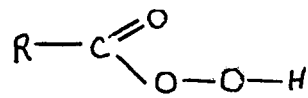

(wherein R is H, methyl or ethyl) in the presence of buffer and in the absence of dimethyl formamide, to form 2,2,6-trimethyl-1-cyclohexen-1-ylvinylacetate (hereinafter referred to as beta-ionone enol ester) having the formula:

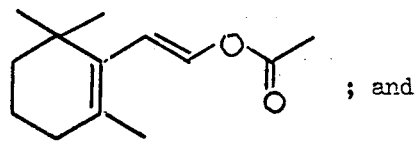

; and ii. hydrolyzing said beta-ionone enol ester using a basic hydrolysis agent to form beta-cyclohomocitral having the structure:

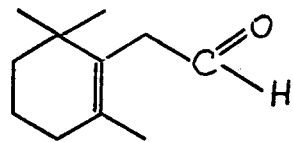

or (B) oxidizing beta-ionone with hydrogen peroxide in the presence of inorganic base to form beta-cyclohomocitral, directly.

5 Claims, No Drawings

PROCESS FOR PREPARING ALPHA-SUBSTITUTED ACETALDEHYDES

BACKGROUND OF THE INVENTION

Beta-cyclohomocitral is a valuable substance useful in the formulation of perfumery, tobacco and food flavoring materials, as disclosed in copending Application for U.S. Letters Pat. No. 507,412 filed on Sept. 19, 1974.

The preparation of beta-cyclohomocitral and beta-ionone enol acetate (an intermediate for producing beta-cyclohomocitral is set forth in British Patent 775,060, which discloses (A) first forming an "iso-$C_{11}$-aldehyde" by (i) condensing ethoxy-acetylene with 2,6,6-trimethylcyclohexanone-1, (ii) partially hydrogenating the resulting acetylenic carbinol so as to convert the triple bond therein into a double bond, and (iii) treating the resuling olefinic compound with an acid; then (B) reacting the resulting iso-$C_{11}$-aldehyde with acetic anhydride and fused sodium acetate under reflux conditions to form beta-ionone enol acetate; and (C) hydrolyzing the beta-ionone enol acetate with alcoholic base (sodium bicarbonate-methanol mixture) to form beta-cyclohomocitral. This multi-step sequence of reactions and the low yield of final product render the synthesis of British Patent No. 775,060 commercially impractical.

Reactions of peracetic acid with α-aralkylidenecyclanones in the presence of buffer are disclosed by Walton J. Org. Chem., 22, 1161 (1957), for example:

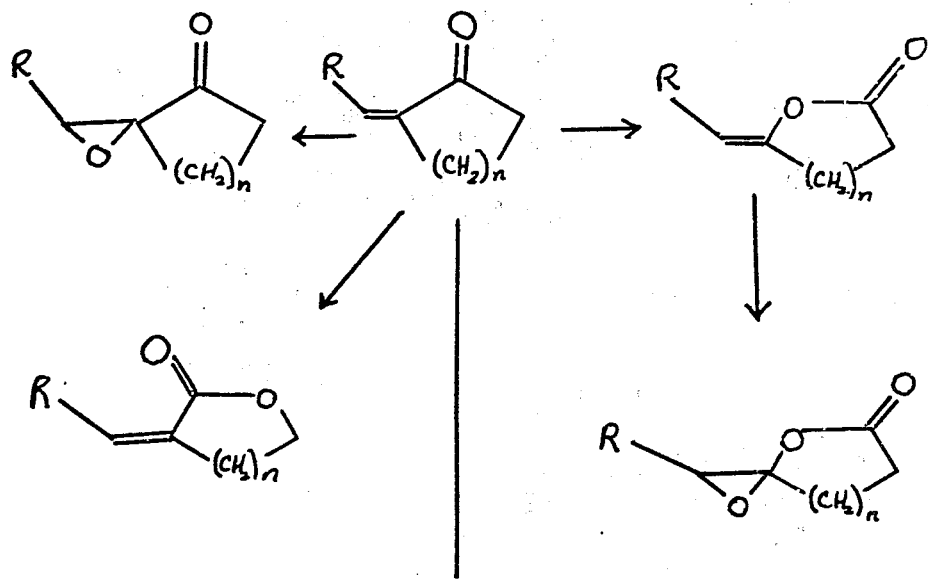

wherein R is phenyl, substituted phenyl or 2-furyl and n is 3 or 4.

Broadly, the reaction of a system containing conjugated unsaturation with a peroxidation agent is known (See Wenkert and Rubin, Nature 170, 708 (1952) wherein the reaction of an alpha, beta-unsaturated ketone having a phenyl moiety in the beta position is oxidized to form an enol ester is taught) but reaction of an ionone type material with an oxidizing agent to form an acyloxyethylene moiety (as opposed to an epoxide moiety) has been heretofore unknown. Also see Böeseken et al., Rec. Trav. Chim. 50, 827 (1931); 52,874 (1933); 55,786 (1936), who have shown that peroxyacetic acid reacts with benzalacetone and related ketones with the insertion of an oxygen atom between the carbonyl and styryl groups, resulting in the formation of enol esters of phenylacetaldehyde and benzyl ketones. A relevant reaction taught by Böeseken et al. is as follows:

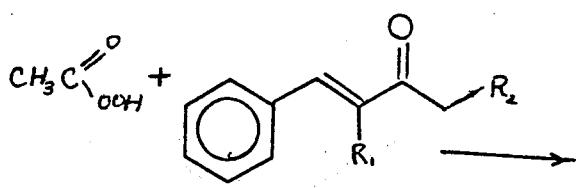

wherein $R_1$ and $R_2$ are each hydrogen or methyl.

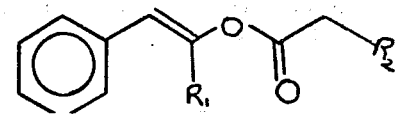

FMC Corporation "Preparation, Properties, Reactions and Uses of Organic Peracids and Their Salts" discloses methods for the preparation of peracetic acid, performic acid and perpropionic acid at pages 3–21 and discusses the use of peracids in carrying out Baeyer-villiger oxidations of unsaturated ketones at pages 84–89.

THE INVENTION

The invention accordingly comprises the novel process and steps, specific embodiments of which are also described hereinafter by use of experiments and in accordance with what is now the preferred practice of the invention.

Briefly, the processes of this invention comprise either (A) a reaction carried out in two steps, the first of which is an oxidation reaction of beta-ionone with either performic acid, peracetic acid or perpropionic acid to form beta-ionone enol ester and, secondly, hydrolyzing the beta-ionone enol ester in the presence of base (aqueous or alcoholic) to form the desired beta-cyclohomocitral or (B) forming beta-cyclohomocitral by oxidizing beta-ionone with hydrogen peroxide in the presence of inorganic base.

More specifically, the process (A) of our invention comprises the steps of:

i. Reacting beta-ionone having the formula:

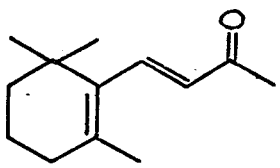

in the absence of dimethyl formamide with a peralkanoic acid having the formula:

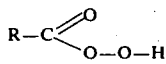

(wherein R is hydrogen, methyl or ethyl) to form beta-ionone enol ester having the formula:

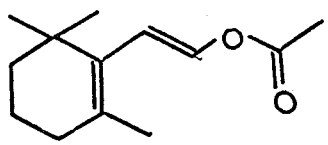

and not the expected beta-ionone epoxide having one of the formulae:

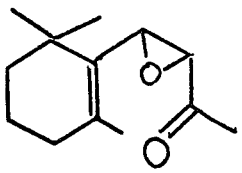 and/or 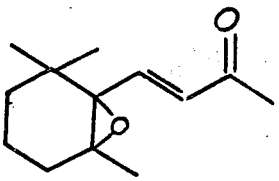

ii. hydrolyzing the beta-ionone enol ester in the presence of base (aqueous or alcoholic) to form beta-cyclohomocitral.

Insofar as the oxidation reaction is concerned: (A) where peralkanoic acids are used as the oxidizing agents, the reaction is preferably carried out in the presence of a buffer such as an alkali metal salt of a lower alkanoic acid or an alkali metal carbonate and a lower alkanoic acid such as propionic acid, acetic acid or formic acid with the following provisos:

i. The reaction is preferably carried out at temperatures of from about 15°C up to about 75°C. Lower temperatures result in slower and less complete reaction and higher temperatures than 75°C result in lower yields of the desired product and significantly higher percentages of by-products. The most preferred temperature of reaction is 25°C;

ii. A slight molar excess (from 10 up to 15 percent) of peracetic acid gives a slightly higher yield of product. A large excess (about 200 percent), however, results in the formation of dihydroactinodiolide having the structure:

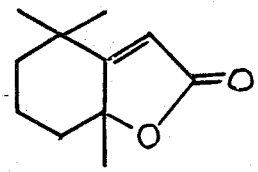

in about 30–35 percent yield when no buffer (e.g., potassium acetate) is present in the reaction mass;

iii. Where potassium carbonate is substituted for potassium acetate as a buffer, the yield of product obtained is substantially the same;

iv. On the other hand, a slightly lower yield of product is obtained by substituting sodium acetate for potassium acetate as the buffer;

v. Substitution of formic acid for acetic acid in the reaction mass gives rise to a lower yield of product;

vi. Any solvent inert to the action of peralkanoic acids may be used in this first oxidation reaction using alkanoic acids. For instance, the use of cyclohexane or chloroform as a solvent does not have an appreciable effect on the yield of product;

vii. Omission of the buffer (i.e., thus performing the reaction under strongly acidic conditions) results in an incomplete reaction, lower yield and greater quantity of by-product(s);

viii. The use of dimethyl formamide as solvent results in the exclusive formation of beta-ionone epoxide having the structure:

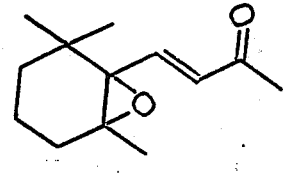

in about 70–75% yield and, accordingly, the presence of dimethyl formamide must be avoided;

ix. The use of monoperphthalic acid (formed in situ from phthalic anhydride and hydrogen peroxide) yields beta-ionone epoxide in 60–70 percent yield. The use of perbenzoic acid in place of a peralkanoic acid has also been used to make beta-ionone epoxide, R. Yves, et al., Helv. Chim. Acta, 29, 880 (1946).

It may be concluded that a peralkanoic acid such as peracetic acid in slight excess in the presence of a buffer system, preferably composed of acetic acid/potassium acetate, is the preferred way to oxidize beta-ionone at 25°C to the corresponding enol acetate.

The beta-ionone enol ester, preferably is hydrolyzed by 10 percent alkali metal hydroxide (e.g., potassium hydroxide, lithium hydroxide or sodium hydroxide) in admixture with 50 percent aqueous methanol, although other mild hydrolysis conditions (such as aqueous potassium carbonate, sodium carbonate or lithium carbonate solution) may also be used. As a result of the hydrolysis, beta-cyclohomocitral is formed.

The resultant reaction product, beta-cyclohomocitral may then be refined according to standard techniques, e.g., preparative gas chromatography, extraction, distillation and the like as further exemplified herein.

B. Where hydrogen peroxide (in the presence of inorganic base) is used as the oxidizing agent, the beta-cyclohomocitral is formed in one step from beta-ionone. The strength of hydrogen peroxide used is from about 10 percent up to about 50 percent. The inorganic base used may be an alkali metal hydroxide or alkali metal carbonate such as sodium carbonate, potassium carbonate, lithium carbonate, sodium hydroxide, potassium hydroxide or lithium hydroxide; preferably sodium hydroxide. The mole ratio of hydrogen peroxide:beta-ionone is preferably from about 1.1:1 up to about 3:1.

The process of our invention is specific to beta-ionone. As further exemplified infra, when the reaction conditions of our process are applied to alpha-ionone, as opposed to beta-ionone, epoxide formation occurs and neither a substantial amount of enol acetate nor isomers of beta-cyclohomocitral are formed.

Examples I–VIII, X, XV, and XVII–XIX, following, serve to illustrate embodiments of our invention as it is now preferred to practice it. Example IX, following, serves to illustrate the unworkability of the process of our invention where dimethyl formamide is used in the oxidation reaction of beta-ionone with peracetic acid. Example III serves to illustrate the poor workability of the reaction where no buffer, e.g., sodium acetate, is used. Examples XI–XIV illustrate the utility of beta-cyclohomocitral, the product of the process of our invention. Example XVI illustrates the unworkability of the instant process in forming alpha-ionone enol ester when operated on alpha-ionone rather than beta-ionone. It will be understood that these examples are illustrative and the invention is to be considered restricted thereto only as indicated in the appended claims.

EXAMPLE I

A. PRODUCTION OF BETA-IONONE ENOL ESTER FROM BETA-IONONE

Into a two liter reaction flask equipped with stirrer, thermometer, reflux condenser, addition funnel and cooling bath, the following materials are added:

i. Solution of 96 grams beta-ionone in 300 cc chloroform;

ii. 30 grams sodium acetate

95 Grams of 40 percent peracetic acid is then added, with cooling, slowly at 10°C during a period of 1 hour. The reaction mass is stirred at 10°C for an additional hour and the solution is then allowed to slowly warm up to room temperature. The reaction mass is then poured into one liter of water and the resultant organic and aqueous phases are separated. The squeous phase is then extracted with 100 cc of chloroform and the resultant organic phases are then bulked. The solvent is evaporated from the organic phase to yield 99.5 grams of an oil which is then chromatographed on 1,000 grams of alumina deactivated with 5% w/w water and eluted as follows:

| Fraction | Volume of Solvent | Quantity of Solute Eluted |
|---|---|---|
| 1 | 750 cc hexane | 8.0 grams |
| 2 | 500 cc hexane | 31.7 grams |
| 3 | 300 cc hexane | 13.5 grams |
| 4 | 250 cc hexane | 7.0 grams |
| 5 | 250 cc hexane | 1.9 grams |
| 6 | 250 cc hexane | 1.6 grams |
| 7 | 600 cc 25% diethyl ether-75% hexane | 15.6 grams |
| 8 | 600 cc diethyl ether | 15.3 grams |

Fractions 1–4 are composed mainly of beta-ionone enol ester.

The spectral data for a purified sample of this amterial obtained by preparative gas chromatography confirm the structure:

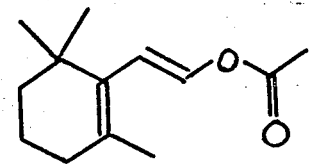

The mass spectrum of this compound has the following fragmentation pattern, in decreasing order of ion abundance:

m/e 166 (100), 151 (81), 43 (30), 208 (30) (molecular ion) and 95 (18). The infrared spectrum shows the following characteristic absorption bands (cm$^{-1}$):

| 3090 | $\underset{H}{\overset{H}{C=C}}$ | (C—H) |
|---|---|---|
| 1752 | C=O | (vinyl ester) |
| 1650 | C=C | (conjugated with oxygen) |
| 1360 | CH$_3$ | |
| 1380 | CH$_3$ | |
| 1365 | —CH$_3$ | |
| 1215 | C—O | (of the ester) |
| 1080 | | |
| 930 | $\underset{H}{\overset{H}{C=C}}$ | |

The NMR spectrum exhibits in CDCl$_3$ solution the following proton absorptions (chemical shifts in ppm):

| Ppm | Multiplicity | Assignment | No. of Protons |
|---|---|---|---|
| 1.00 | (s) | CH$_3$ \ / CH$_3$ C | 6H |
| 1.70–1.40 | (m) | —CH$_2$— | 7H |
| 1.76 | (s) | =C—CH$_3$ | |
| 2.00 | (t) | =C—CH$_2$— | 2H |

-continued

| Pom | Multiplicity | Assignment | No. of Protons |
|---|---|---|---|
| 2.16 | (s) | CH₃—C(=O)(O—) | 3H |
| 5.86 and 7.20 | (m) | Olefinic protons | 2H |

B. HYDROLYSIS TO FORM BETA-CYCLOHOMOCITRAL FROM BETA-IONONE ENOL ESTER

Beta-ionone enol ester (60.2 grams from Fractions 1–4 produced in Part A) is added to 280 cc of 10 percent potassium hydroxide solution, (50:50 water:methanol mixture) at room temperature and stirred for a peroid of 30 minutes. Water 1,000 cc is added to the reaction mass which is then extracted with three 250 cc portions of diethyl ether. The combined ether extract is washed twice with two 100 cc portions of saturated sodium chloride solution, dried over anhydrous magnesium sulfate and evaporated to obtain 53 grams of an oil, beta-cyclohomocitral.

The crude beta-cyclohomocitral is distilled at 2 mm Hg pressure and the fraction boiling at 70°–80°C is collected (35.6 g).

Gas chromatographic analysis indicates that the product is about 85% pure. A pure sample of beta-cyclohomocitral is obtained by preparative chromatography (conditions: 10 feet × ¼ inches 10% carboway —20M packed stainless steel column at 220°C isothermal) and is characterised by the following analytical data as:

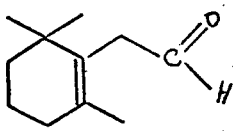

Mass spectral fragmentation, in decreasing order of ion abundance:

m/e (%) 107(100); 29(93); 151(90); 41(88); 81(80); 95(67); 123(57); 55(45); 39(45); 27(43); 166(Mol ion)(35).

The infrared spectrum shows the following characteristic absorption bands (cm⁻¹):

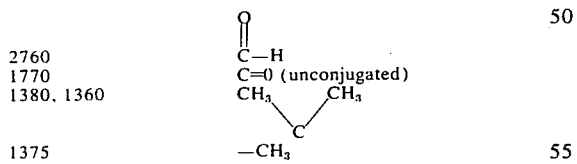

| 2760 | C—H |
| 1770 | C=O (unconjugated) |
| 1380, 1360 | CH₃\C/CH₃ |
| 1375 | —CH₃ |

The NMR spectrum of the compound is in agreement with the above structure:

| (PPM) | Multiplicity | Assignment | Number of Protons |
|---|---|---|---|
| 0.98 | (s) | CH₃\C/CH₃ | 6H |
| 1.58 | (s) | =C—CH₃ | |
| 1.80–1.42 | (m) | —CH₂— | 9H |
| 2.00 | (t) | =C—CH₂—C(=O) | 2H |
| 9.58 | (t) | HC=O | 1H |

EXAMPLES II–X

The following examples, carried out using the same procedure as Example I, illustrate the results which occur when parameters of the oxidation reaction of beta-ionone with peracetic acid are varied, e.g., as to buffer solvent, temperature, presence of organic base and ratio of organic alkanoic acid to peracetic acid. The percentages given are obtained by gas chromatographic analyses of the reaction mixture after 30 minutes and do not represent yields of isolated material.

| Example No. | % Enol Ester | % Starting Material | % By-Products | Reactants and Reaction Conditions |
|---|---|---|---|---|
| II | 47 | 24 | 29 | Acetic acid-(150 cc) Sodium acetate (20 g) Beta-ionone-(30 g) 40% peracetic acid-(30 g) Temperature: 25°C. |
| III | 12 | 52 | 36 | Acetic acid-(150 g) Beta-ionone-(30 g) 40% peracetic acid-(30 g) Temperature: 25°C. |
| IV | 40 | 29 | 31 | Cyclohexane-(150 cc) Sodium acetate-(20 g) Beta-ionone-(30 g) 40% peracetic acid (30 g) Temperature 25°C |
| V | 52 | 26 | 22 | Acetic acid-(150 cc) Potassium acetate (35 g) Beta ionone-(30 g) 40% peracetic acid (30 g) Temperature: 25°C |
| VI | 31 | 30 | 39 | Formic acid-(150 cc) Potassium acetate-(50 g) Beta-ionone-(30 g) 40% peracetic acid (30 g) Temperature: 25°C |
| VII | 49 | 6 | 45 | Acetic acid-(150 cc) Potassium acetate-(35 g) Beta-ionone-(30 g) 40% Peracetic acid (33 g) Temperature: 25°C |
| VIII | 36 | 21 | 43 | Acetic acid-(150 cc) Potassium acetate-(35 g) Beta-ionone-(30 g) 40% Peracetic acid-(33 g) Temperature: 50°C |
| IX | 0 | 9 | 91 Beta-ionone epoxide | Dimethyl formamide (150 cc) Beta-ionone-(30 g) 40% peracetic acid-(33 g) |

| Example No. | % Enol Ester | % Starting Material | % By-Products | Reactants and Reaction Conditions |
|---|---|---|---|---|
| X | 55 | 17 | 28 | Temperature: 4 days at a temperature of 18°C. Acetic acid-(450 cc) Potassium acetate-(105 g) Beta-ionone-(96 g) 40% peracetic acid-(105 g) Temperature: 25°C. |

EXAMPLE XI

PETITGRAIN FORMULATION

The following mixture is prepared:

| Ingredients | Parts by Weight |
|---|---|
| Betacyclohomocitral | 20 |
| Linalool | 500 |
| Linalyl Acetate | 600 |
| Dimethyl Anthranilate | 2 |
| Terpineol | 20 |
| Geraniol | 30 |
| Terpinyl Acetate | 10 |
| Geranyl Acetate | 5 |
| Ocimene | 20 |
| Limonene | 50 |
| Pinene | 20 |
| Nerolidol | 10 |

The beta-cyclohomocitral imparts the green, earthy note of petitgrain required in such petitgrain formulations.

EXAMPLE XII

PREPARATION OF A SOAP COMPOSITION

100 Grams of soap chips are mixed with one gram of the perfume composition of Example XI until a substantially homogeneous composition is obtained. The perfumed soap composition manifests an excellent petitgrain character with excellent green, earthy notes.

EXAMPLE XIII

PREPARATION OF A DETERGENT COMPOSITION

A total of 100 grams of detergent powder is mixed with 0.15 grams of the perfume composition of Example XI, until a substantially homogeneous composition is obtained. This composition has an excellent petitgrain aroma with earthy green notes.

EXAMPLE XIV

RASPBERRY FLAVOR FORMULATION

The following basic raspberry flavor formulation is produced:

| Ingredient | Parts by Weight |
|---|---|
| Vanillin | 2.0 |
| Maltol | 5.0 |
| Parahydroxybenzylacetone | 5.0 |
| Alpha-ionone (10% in propylene glycol) | 2.0 |
| Ethyl Butyrate | 6.0 |
| Ethyl Acetate | 16.0 |
| Dimethyl Sulfide | 1.0 |
| Isobutyl Acetate | 13.0 |
| Acetic Acid | 10.0 |
| Acetaldehyde | 10.0 |
| Propylene Glycol | 930.0 |

Beta-cyclohomocitral is added to half of the above formulation at the rate of 0.2%. The formulation with the beta-cyclohomocitral is compared with the formulation without the beta-cyclohomocitral at the rate of 0.01 percent (100 ppm) in water and evaluated by a bench panel.

The flavor containing the beta-cyclohomocitral is found to have a substantially more pleasant and better raspberry aroma. It is the unanimous opinion of the bench panel that the chemical, beta-chclohomocitral rounds the flavor out and contributes to a very natural fresh aroma and taste as found in full ripe raspberries. Accordingly, the flavor with the addition of the beta-cyclohomocitral is considered as substantially better than the flavor without beta-cyclohomocitral.

EXAMPLE XV

PREPARATION OF BETA-CYCLOHOMOCITRAL BY $H_2O_2$ PEROXIDATION OF BETA-IONONE

To 20 grams of beta-ionone in 100 ml methanol is added 12 ml of 30% hydrogen peroxide. The solution is then cooled to 15°C and 18 ml 6 molar aqueous sodium hydroxide is added over a period of 30 minutes while maintaining the reaction mixture at 15°C. The reaction mixture is then allowed to warm up to 30°C and then maintained at 30°C with external cooling. The exotherm lasts approximately 60 minutes. Examination of the reaction product by gas chromatography indicates that some beta-ionone is still present. An additional 12 ml of 30% $H_2O_2$ and 18 ml 6 molar aqueous NaOH are added during a 30-minute period while maintaining the temperature at 25°C. Again an exotherm occurs lasting approximately 60 minutes during which time the temperature is maintained at 30°C. The reaction mass is then poured into excess water (500 ml) and the product is then extracted with three 150 ml portions of diethyl ether. The combined ether extracts are then washed with two 150 ml portions of saturated sodium chloride solution and dried over anhydrous $MgSO_4$. The solvent is then evaporated to yield 16.8 grams of a crude oil.

Examination of this material by gas chromatography indicates 22% beta-cyclohomocitral.

The desired product is obtained by preparative gas chromatography (conditions: 10 feet × 1/4 inches 10% carbowax 20 M packed stainless steel column at 220°C isothermal).

The structure is confirmed by IR, MS and NMR analyses as being:

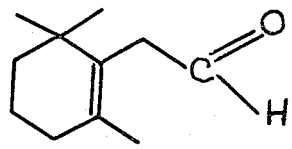

EXAMPLE XVI

FORMATION OF ALPHA-IONONE EPOXIDE FROM ALPHA-IONONE

Into a 500 ml flask equipped with thermometer, stirrer, addition funnel and reflux condenser, the following materials are placed in the following order:

| Ingredients | Amount |
|---|---|
| Acetic Acid | 150 cc |
| Potassium Acetate | 35 grams |
| Alpha-Ionone | 30 grams |

33 grams of 40% peracetic acid is then added dropwise into the reaction mass with stirring at 25°C over a 45-minute period. The reaction mass exotherms for approximately one hour and is then allowed to remain at room temperature for a period of 15 hours.

The reaction mass is then poured into 500 ml water and the product is extracted with three 150 cc portions of diethyl ether. The ether extracts are combined and washed with two 100 cc portions of saturated sodium chloride solution and dried over anhydrous magnesium sulfate. The residual oil obtained after stripping the solvent, is distilled at 93–99°C at 0.5 mm Hg pressure yielding 28.3 g of a clean colorless liquid.

IR, MS and NMR analyses confirm the fact that the product is alpha-ionone epoxide having the structure:

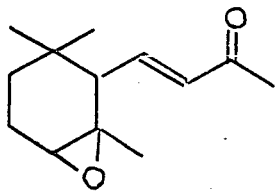

EXAMPLE XVII

PRODUCTION OF BETA-CYCLOHOMOCITRAL

Into a two liter reaction flask equipped with stirrer, thermometer, addition funnel and cooling bath, the following materials are placed in the following order:

| Ingredients | Amounts |
|---|---|
| Acetic Acid | 450 cc |
| Potassium Acetate | 105 g |
| Beta-Ionone | 96 g |

105 Grams of 40% peracetic acid is then added dropwise to the reaction mass with cooling while maintaining the reaction mass at 25°C+2°C over a 2 hour period. The reaction mass is then stirred for an additional 3 hour period (during the first hour a slight exotherm occurs) at 25°C.

The reaction mass is then poured into 1,000 ml water and the resultant product is extracted with three 300 cc volumes of diethyl ether. The ether extracts are combined and washed with two 150 cc portions of saturated sodium chloride solution. The resultant washed ether extract is then evaporated whereby 118 grams of residual oil is obtained.

400 cc of 10% potassium hydroxide solution (50:50 mixture, water:methanol) is prepared and the 118 grams of residual oil obtained above is added thereto. The resultant solution warms up slightly and is stirred for a period of 45 minutes.

The solution is then poured into 500 ml water and the product is extracted with three 250 cc portions of diethyl ether. The diethyl ether extract is then washed with two 200 cc portions of saturated sodium chloride solution, dried over anhydrous magnesium sulfate and evaporated to obtain 89 grams of a crude oil. This crude oil is distilled through a Vigreaux distillation column at 70°–75°C and 2.0 mm Hg pressure to obtain 40.2 grams of a compound having the structure:

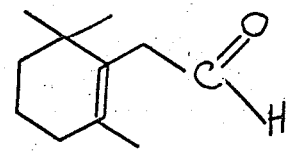

as confirmed by infrared (IR), nuclear magnetic resonance (NMR) and mass (MS) spectra.

EXAMPLE XVIII

Perpropionic acid is prepared in the following manner. A mixture of the following materials:

| | |
|---|---|
| 160 ml propionic acid<br>1 ml sulfuric acid (concentrated)<br>4 g 50% hydrogen peroxide | Referred to hereinafter as "Mixture A" | is allowed to stand for 20 hours at room temperature.

The following reactants are placed in a 500 ml reaction flask equipped with a stirrer and cooling bath:

| | |
|---|---|
| 140 ml propionic acid<br>75 g potassium acetate<br>60 g beta-ionone | Referred to hereinafter as "Mixture B" |

To the stirred Mixture B is added, dropwise, Mixture A over a 60-minute period while maintaining the reaction temperature at 25° ± 2°C by means of external cooling. When the addition is complete the reaction mixture is stirred for an additional 2 hours at 25°C.

The reaction mixture is then poured into 1,000 ml water and extracted twice with 250 ml portions of diethyl ether. The combined ether extracts are then washed first with water (three 100 ml portions) and then with a saturated solution of sodium chloride (150 ml). The ether solution is then dried over anhydrous magnesium sulfate and the solvent evaporated to yield 78 g of crude oil containing propionic acid as well as product. The crude product is hydrolyzed with a solution of 40 g potassium carbonate in 300 ml of water by heating under reflux, with stirring, for 15 hours. After cooling the organic layer is collected and the aqueous layer is extracted with 200 ml of diethyl ether. After combining the organic materials the solvent is removed by evaporation to yield 57.5 g of oil which is distilled to yield 19.5 g of beta-homocyclocitral (Yield: 37%).

EXAMPLE XIX

Performic acid is prepared in the following manner: 20 g 50% hydrogen peroxide and 80 ml of formic acid is admixed and the reaction mass is left at room temperature for 1.5 hours.

To a mixture consisting of 50 g of potassium acetate, 70 ml of acetic acid and 30 g of beta-ionone is added the preformed performic acid, prepared as described above, dropwise over a 30 minute period while maintaining the temperature of the stirred reaction mass at 25°C by means of external cooling. After the addition is complete, the mixture is stirred for a further 90 minutes at 25°C and is then poured into 800 ml of water. The product is extracted with two 200 ml portions of diethyl ether. The ether extracts are combined, washed with two 150 ml portions of saturated sodium chloride solution and then dried. Removal of the solvent by evaporation yields 32.5 g crude oil.

A gas chromatographic analysis of this material shows the following compositions:

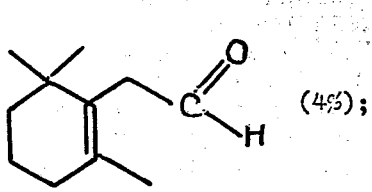 (4%);

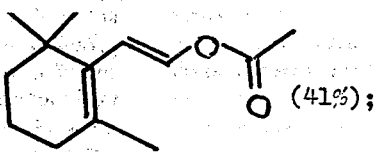 (41%);

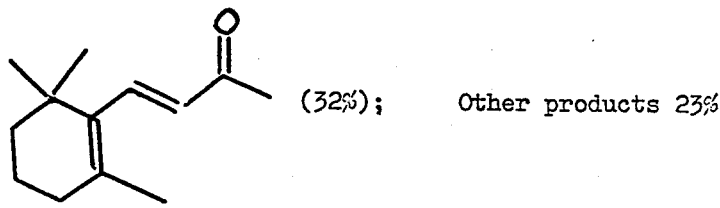 (32%); Other products 23%

The following mixture is prepared:
20 g Lithium carbonate
200 ml 50% aqueous methanol To this is added the crude enol ester product obtained as described above. The mixture is then heated at 65°–70°C until substantially complete hydrolysis of the enol ester to beta-homocyclocitral as indicated by gas chromatographic analysis. Water is added to the reaction mass which is then extracted with three 100 cc portions of diethyl ether. The combined ether extracts are washed twice with two 100 cc portions of saturated sodium chloride solution, dried over anhydrous magnesium sulfate and evaporated to obtain an oil, beta-cyclohomocitral.

The crude is distilled at 2 mm Hg pressure and the fraction boiling at 70°–80°C is collected.

Gas chromatographic analysis indicates that the product is about 85% pure. A pure sample of beta-cyclohomecitral is obtained by preparative chromatography and is characterized by the following analytical data as:

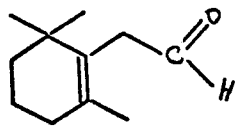

Mass spectral fragmentation, in decreasing order of ion abundance:

m/e (%) 107(100); 29(93); 151(90); 41(88); 81(80); 95(67); 123(57); 55(45); 39(45); 27(43); 166Mol ion) (35).

Infrared spectrum shows characteristic absorption at:

| | |
|---|---|
| 2760 cm$^{-1}$ | $\overset{O}{\overset{\|}{C}}$—H |
| 1770 cm$^{-1}$ | C=O (unconjugated) |
| 1380, 1360 cm$^{-1}$ | CH$_3$\\C/CH$_3$ |
| 1375 cm$^{-1}$ | —CH$_3$ |

The NMR spectrum of the compound is in agreement with the above structure:

| (PPM) | Multiplicity | Assignment | Number of Protons |
|---|---|---|---|
| 0.98 | (s) | CH$_3$\\C/CH$_3$ | 6H |
| 1.58 | (s) | —C—CH$_3$ | |
| 1.80 – 1.42 | (m) | —CH$_2$— | 9H |
| 2.00 | (t) | =C—CH$_2$—C(=O) | 2H |
| 9.58 | (t) | HC=O | 1H |

What is claimed is:

1. The process for preparing 2,6,6-trimethyl-1-cyclohexen-1-ylacetaldehyde comprising the steps of:

i. Intimately admixing a peralkanoic acid having the structure:

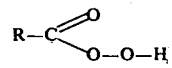

wherein R is selected from the group consisting of hydrogen, ethyl and methyl with beta-ionone in the absence of dimethyl formamide solvent and in the presence of (a) a buffer selected from the group consisting of sodium acetate, sodium carbonate, potassium acetate and potassium carbonate; (b) a lower alkanoic acid selected from the group consisting of formic acid and acetic acid; and (c) a chloroform solvent inert to the action of the peralkanoic acid; and at a temperature in the range of 15°C up to 75°C, to form 2,6,6-trimethyl-1-cyclohexen-1-ylvinylacetate; said peracid being in slight molar excess with respect to said beta-ionone;

ii. Hydrolyzing said 2,6,6-trimethyl-1-cyclohexene-1-ylvinylacetate with either (a) an aqueous alcoholic solution of an alkali metal hydroxide selected from the group consisting of NaOH, KOH and LiOH, or (b) an aqueous solution of an alkali metal carbonate selected from the group consisting of sodium carbonate, potassium carbonate and lithium carbonate thereby forming 2,6,6-trimethyl-1-cyclohexen--ylacetaldehyde.

2. The process of claim 1 wherein the lower alkanoic acid is formic acid.

3. The process of claim 1 wherein the lower alkanoic acid is acetic acid.

4. The process of claim 1 in which the base used in process step (ii) to hydrolyze the 2,6,6-trimethyl-1-cyclohexene-1-ylvinylacetate is an squeous alcoholic solution of an alkali metal hydroxide selected from the group consisting of NaOH, KOH and LiOH.

5. The process of claim 1 in which the base used in process step (ii) to hydrolyze the 2,6,6-trimethyl-1-cyclohexene-1-ylvinylacetate is an aqueous solution of an alkali metal carbonate selected from the group consisting of sodium carbonate, potassium carbonate and lithium carbonate.

* * * * *

UNITED STATES PATENT AND TRADEMARK OFFICE
CERTIFICATE OF CORRECTION

PATENT NO. : 3,956,393
DATED : May 11, 1976
INVENTOR(S) : ALAN OWEN PITTET and ERICH MANFRED KLAIBER It is certified that error appears in the above-identified patent and that said Letters Patent are hereby corrected as shown below:

Col. 2, line 63, at the beginning of the line, "er-villiger" should read "er-Villiger".

Col. 7, line 30, last word "carboway" should read "carbowax".

Signed and Sealed this

Fifteenth Day of March 1977

[SEAL]

Attest:

RUTH C. MASON
Attesting Officer

C. MARSHALL DANN
Commissioner of Patents and Trademarks